United States Patent [19] [11] 4,320,392
Giovinazzo et al. [45] Mar. 16, 1982

[54] TRANSDUCER WITH SIX DEGREES OF FREEDOM

[75] Inventors: Giovanni Giovinazzo, Nichelino; Piergiorgio Varrone, Pino Torinese, both of Italy

[73] Assignee: Centro Ricerche Fiat S.p.A., Orbassano, Italy

[21] Appl. No.: 182,263

[22] Filed: Aug. 28, 1980

[30] Foreign Application Priority Data

Sep. 25, 1979 [IT] Italy ................................ 68863 A/79

[51] Int. Cl.³ ............................................. G01P 15/08
[52] U.S. Cl. ............................... 340/365 C; 200/6 A; 200/DIG. 1
[58] Field of Search ........... 340/365 C, 365 R, 347 P, 340/709, 710; 74/471 XY; 200/6 A, 52 A, 61.52, DIG. 1

[56] References Cited

U.S. PATENT DOCUMENTS 4,142,180  2/1979  Barson ................................ 340/709
4,161,726  7/1979  Barson et al. ..................... 340/365 R
4,190,834  2/1980  Doornink ........................... 340/709

OTHER PUBLICATIONS

"Keyboard Scanned Capacitive Joy Stick Cursor Control", *IBM Tech. Disclosure Bulletin*, vol. 23, No. 8, Jan. 1981.

*Primary Examiner*—Gerald L. Brigance
*Attorney, Agent, or Firm*—Sughrue, Mion, Zinn, Macpeak and Seas

[57] ABSTRACT

A transducer is provided which has six degrees of freedom and is arranged to output electrical signals indicative of the forces and moments applied thereto. The transducer comprises a rigid casing which, for example, is of cubic form. The casing is intended to be connected, for example, to the movable arm of a robot. A rigid body of a shape similar to the casing is suspended fluidically within the casing and is connected to a control shaft which projects through the casing. The external faces of the rigid body and the inner faces of the casing are both provided with conductive portions which together constitute a plurality of condensers the capacitance of which depends on the relative positioning of the body and casing. Forces and moments applied to the control shaft produce corresponding variations in the capacitance of these condensers and can therefore be easily measured.

8 Claims, 9 Drawing Figures

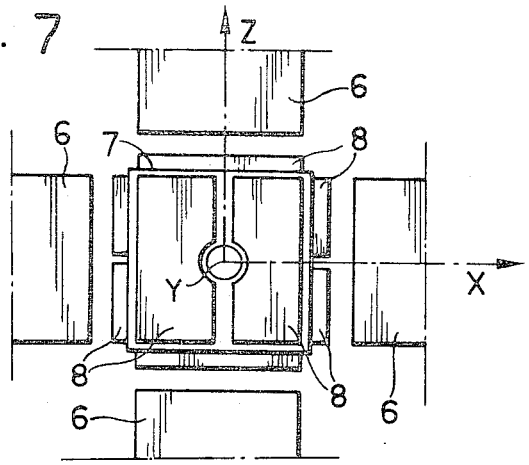
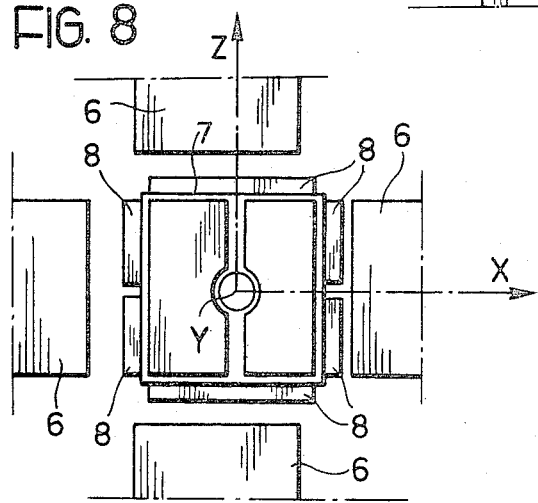
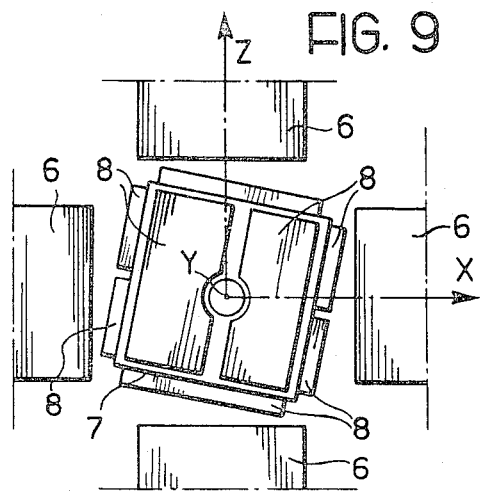

TRANSDUCER WITH SIX DEGREES OF FREEDOM

The present invention relates to a transducer with six degrees of freedom which is arranged to generate electrical signals indicative of forces and moments applied to a movable member to which the transducer is connected during use; in particular, but not exclusively, the invention relates to such transducers for use with the movable arm of an industrial robot.

Industrial robots are operating machines constituted essentially by at least one metal arm having one or more degrees of freedom, which by means of a suitable "hand" is able to perform a wide variety of operations which are heavy, dangerous, and unpleasant for people in that they are extremely repetitive. The hand of the robot can, as required, be constituted by pincers, by a welding electrode, by a spray gun for painting, or by any other suitable device.

In each case, in order to enable the robot to perform a specific task or series of tasks, the robot is first taken through the various steps required to execute the task so that the central control unit of the robot can "learn" the path through space which must be subsequently repeated. This "teaching" operation is most conveniently carried out by means of dynamic operation of the robot rather than by having to resort to a long and complicated static "point to point" teaching procedure or by the substitution of the arm of the robot with a light replacement arm attached only to the position transducers of the robot but not to its motors.

It is moreover necessary to be able to make the robot sensitive to the stresses and to the reaction forces which occur when the hand of the robot is used, for example, to assemble workpieces onto a structure; in other words, the robot requires a sensitive "wrist" which, as well as transmitting to the hand the forces required to move a workpiece held in the robot hand, must also be able to detect the reaction forces exerted on this workpiece by the structure on which the workpiece is to be assembled. This sensitive "wrist", as well as detecting the said reaction forces, must be able to generate electrical signals for controlling the motors of the robot for the purpose of optimising their movement.

To satisfy the above requirements, it is necessary to provide highly-sensitive transducers with six degrees of freedom, these transducers being free of mechanical hysteresis and being capable of generating output signals indicative of the forces acting in respect of each degree of freedom substantially without the generation of spurious signals in correspondence to the degrees of freedom not involved in a particular action or movement of the robot hand.

Transducers having six degrees of freedom and utilising strain gauges are known. These known transducers have various disadvantages such as their necessity for complicated calibration operations. Furthermore, before using these transducers it is necessary to carry out a study of the elastic and deformation characteristics of the structure to which the transducers are to be applied. Finally, the circuits used for processing the signals output by the strain gauges are rather complicated, and their general reliability is not industrially acceptable.

The object of the present invention is to provide a transducer having six degrees of freedom in which the above mentioned disadvantages are obviated.

With a view to realising this object, the present invention provides a transducer with six degrees of freedom which is arranged to generate electrical signals indicative of forces and moments supplied to a movable member to which the transducer is connected during use, said transducer comprising:

a rigid casing intended to be connected to the said movable member; the inner surface of the said casing having three pairs of electrically conductive faces, the faces of each pair lying in planes parallel to one another and perpendicular to the planes in which lie the faces belonging to the other pairs;

a rigid body supported within said casing such as to be displaceable with six degrees of freedom relative to the casing; the outer surface of the said body comprising three pairs of faces, the faces of each pair lying in planes parallel to one another and perpendicular to the planes in which lie the faces belonging to the other pairs; each said face of the rigid body facing towards a corresponding one of the said electrically-conductive faces of the inner surface of the casing and being provided with at least two electrically conductive zones which are coplanar with and electrically insulated from one another and which together extend over substantially the whole of said body face; the conductive zones associated with each outer face of said body being spaced by a narrow interspace from the corresponding electrically conductive face of the casing;

a shaft connected to the said rigid body and passing with clearance through a hole in the casing, said shaft serving as a control or reaction member;

fluid supply means for feeding a dielectric fluid under pressure through the walls of the said casing into each of the said interspaces, the dielectric fluid being constrained to enter each said interspace in a direction substantially orthogonal to the associated electrically conductive face of the casing inner surface wherey the said body is fluidically supported in the said casing, the said conductive zones together with the said electrically-conductive faces of the casing which face towards these zones constituting a plurality of condensers equal in number to the number of said conductive zones, the capacitance of each said condenser being dependent on the distance between the conductive zone and casing face constituting the condenser; and detector means electrically connected to the said casing and to each of the said zones and operative to provide electrical output signals indicative of the instantaneous values and/or of the variations of the capacitance of each of the said condensers with variations of the forces and moments applied to the said shaft.

A transducer embodying the invention will now be particularly described, by way of example, with reference to the accompanying diagrammatic drawings, in which:

FIGS. 7, 8 and 9 are sectional view of the transducer schematically showing the transducer in a first, a second, and a third operative position respectively.

Figure 1:
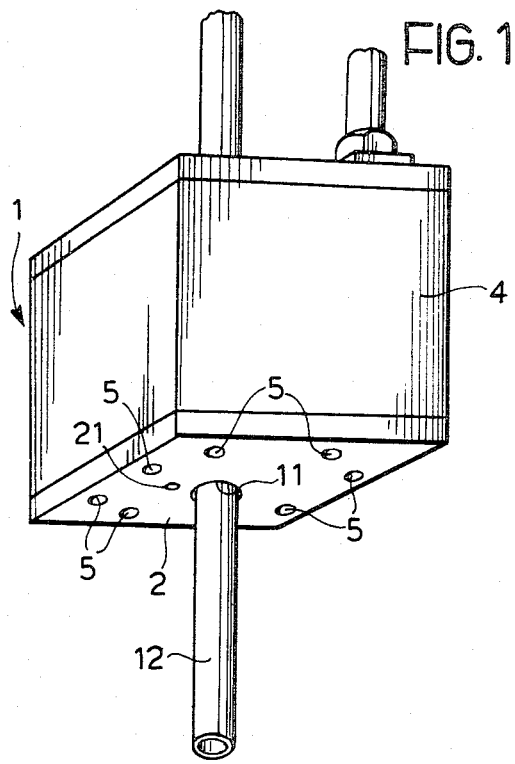
FIG. 1 is a perspective view of the transducer.

As shown in FIG. 1, the transducer includes a metal casing 1 which is substantially in the form of a hollow cube and comprises an outer shell constituted by an annular element 4 and two closure plates 2 and 3. The closure plates 2, 3 are fixed to the annular element 4 by means of screws 5.

Figure 2:
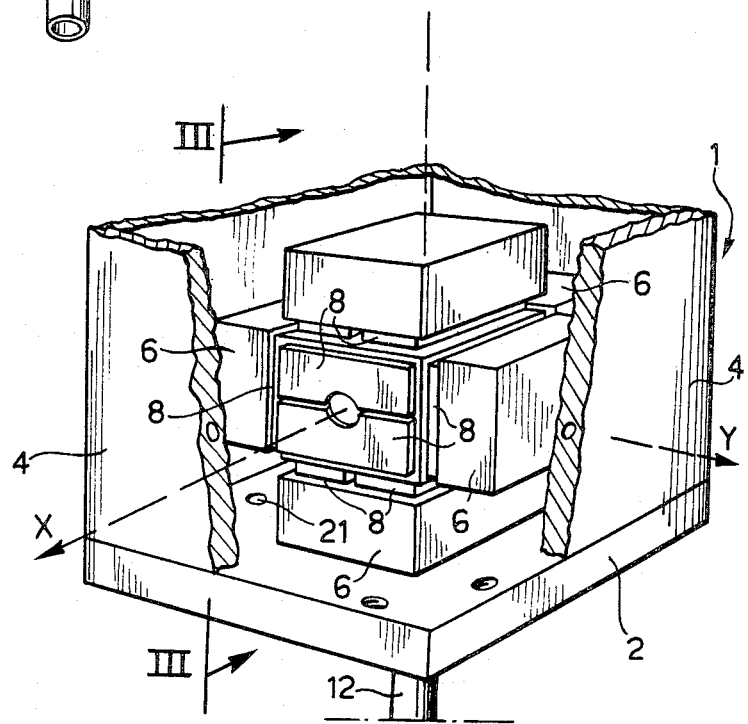
FIG. 2 is a cut-away perspective view of the transducer.

As is illustrated in FIG. 2, the walls of the casing shell are relatively thin. In addition to its outer shell, the casing 1 comprises six small blocks 6 of electrically conductive material which are secured to the inner face of respective walls of the casing shell. Each block 6 is in the form of a parallelepiped.

Figure 3:
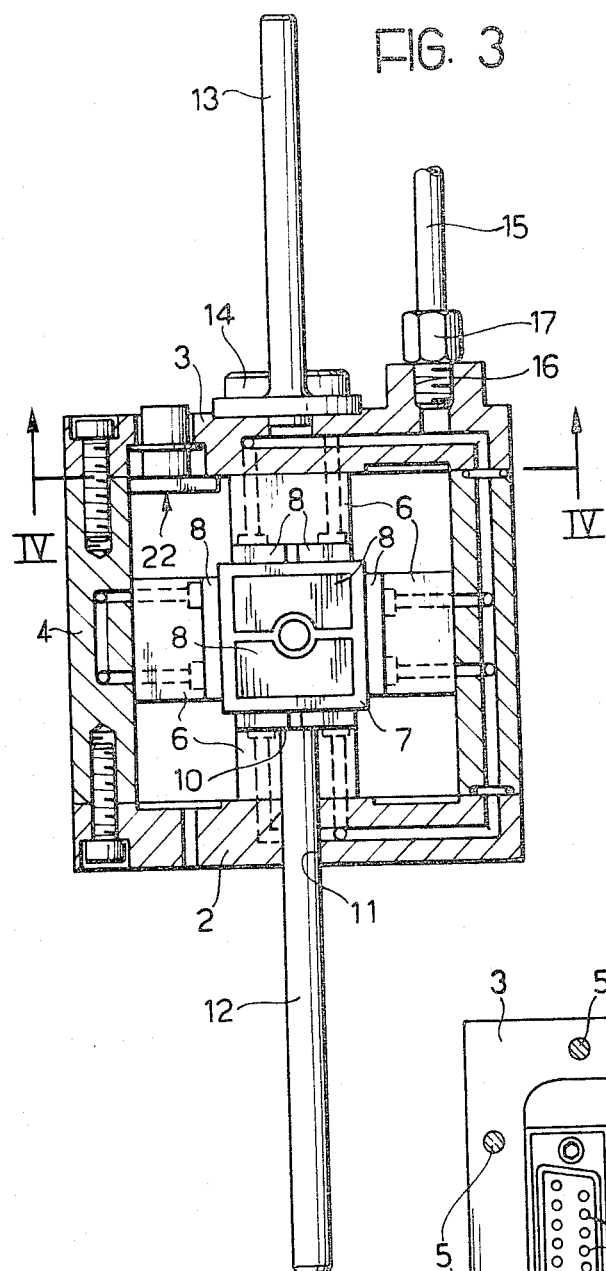
FIG. 3 is a section on line III—III of FIG. 2
Figure 5:
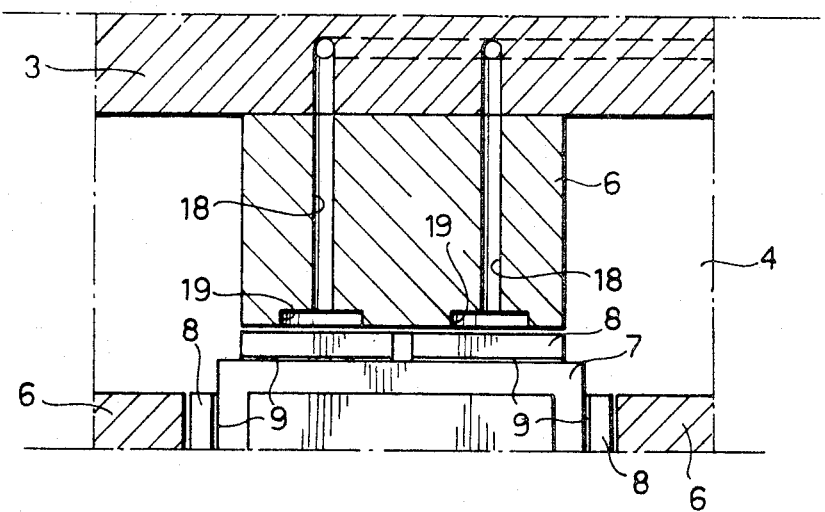

Disposed within the said casing 1 is a rigid body 7 in the shape of a cube (see FIGS. 2 and 3). The cubic body 7 is for example, made of metallic material. Each of the faces of the body 7 faces towards an end surface of a respective one of the metal blocks 6. Each face of the body 7 is covered over substantially the whole of its extent by a respective pair of plates 8 of electrically conductive material, the plates 8 of each pair being coplanar and electrically isolated from each other. The plates 8 are also electrically isolated from the body 7 either by covering the face of each plate 8 which is in contact with the body 7 with a layer of electrically isolating oxide 9 (FIG. 5) this layer being formed for example, by means of anodic oxidisation or by the provision of insulators interposed between the plates 8 and the body 7.

The pairs of conductive plates 8 which cover each of the faces of the body 7 are separated from the opposing end face of the corresponding metal block 6 by a narrow interspace. As a result, the body 7 can perform limited linear and/or rotational movements relative to the casing 1. More specifically and with reference to FIG. 2, the rigid body can undergo displacements relative to the casing 1 which can be expressed as combinations of linear displacements along three mutually orthogonal axes X, Y and Z, and angular displacements corresponding to rotations about the said axes. The body 7 can thus be seen to possess six degrees of freedom in respect of its displacement relative to the casing 1.

The metal block 6 which is connected to the casing closure plate 2 is provided centrally with a circular through hole 10, as is illustrated in FIG. 3. The closure plate 2 is also provided with a circular through hole 11 in alignment with the hole 10 in the metal block 6.

A shaft 12 which, as will be described below, serves as a control and reaction member, is rigidly connected to the body 7 and projects from the casing 1 through the holes 11, 10 through which it passes with clearance.

A second control shaft 13 is rigidly connected by means of screws 14 to the closure plate 3 of the casing 1.

In use, the control shaft 13 is rigidly connected either to a movable arm (not shown, for example of an industrial robot) or to a similar, non-movable, support.

The closure plate 3 of the casing 1 is formed with a threaded through hole 16 (see FIG. 3). A flexible tube 15 is connected to the plate 3 in correspondence with the hole 16 by means of a coupling 17.

Each of the metal blocks 6 is provided with through holes 18 (FIG. 5) which extend perpendicularly to the inner face of the casing shell to which the block 6 is connected. Each of the said through holes 18 in each block 6 has an enlarged end portion 19 which opens towards a corresponding one of the two conductive plates 8 mounted on the face of the body 7 opposite the block 6.

Figure 6:
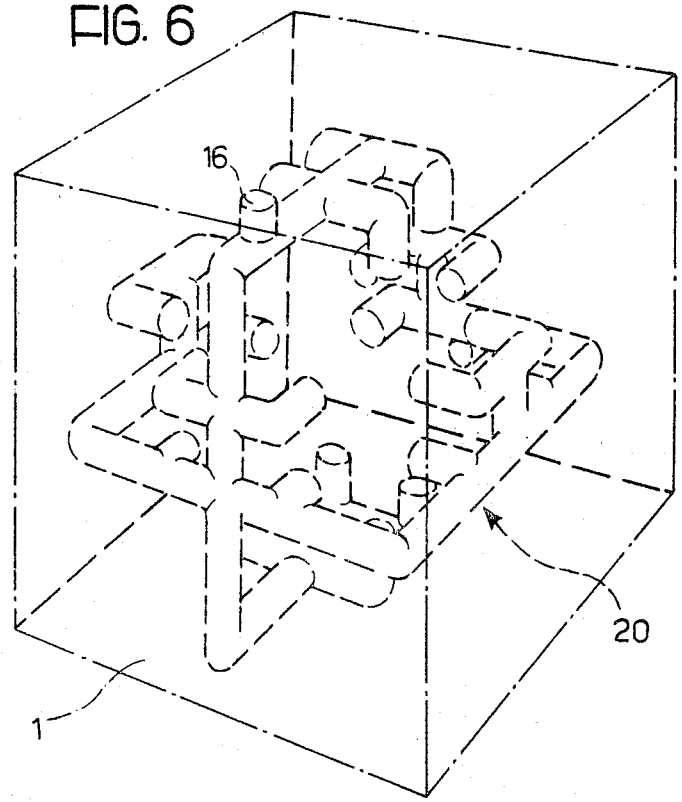
FIG. 6 is a perspective view illustrating ducting used to feed dielectric fluid into the transducer.

The through holes 18 of each block 6 communicate with the flexible tube 15 by means of a system of ducts 20 formed in the walls of the casing shell. This system of ducts is illustrated in part in FIG. 3, and in its entirety in FIG. 6.

In addition to the through hole 10, the closure plate 2 of the casing 1 is formed with a further through hole 21.

In use of the transducer, a source of compressed fluid (not shown) is connected to the flexible tube 15. This source C which, for example, is a compressed-air generator of known type) feeds fluid under pressure via the said flexible tube 15, the system of ducts 20 and the through holes 18, into the interspaces between the end faces of each block 6 and the facing conductive plates 8 whereby the body 7 is fluidically suspended within the casing 1 with the plates 8 spaced from the blocks 6. Conveniently the distance between the end face of each block 6 and the facing conductive plates 8 is of the order of tens of microns. The pairs of conductive plates 8 carried by the body 7 cooperate with the corresponding end face of the blocks 6 to constitute twelve condensers (two per block 6) the capacitance of each of which depends on the distance between the corresponding conductive plate 8 and the facing block end face. The compressed fluid which maintains the body 7 fluidically suspended within the casing 1 constitutes the dielectric material of the condensers.

The hole 21 in the closure plate 2 allows the compressed flulid to flow out from the casing 1.

As already mentioned, the control shaft 12 is connected rigidly to the body 7. In use, the projecting end of the shaft 12 can be connected directly to the "handle" of the arm of a robot, this handle being grasped by the operator during the "learning" phase of robot operation in order to make the robot execute for the first time a series of operations which the robot must subsequently repeat.

Figure 4:
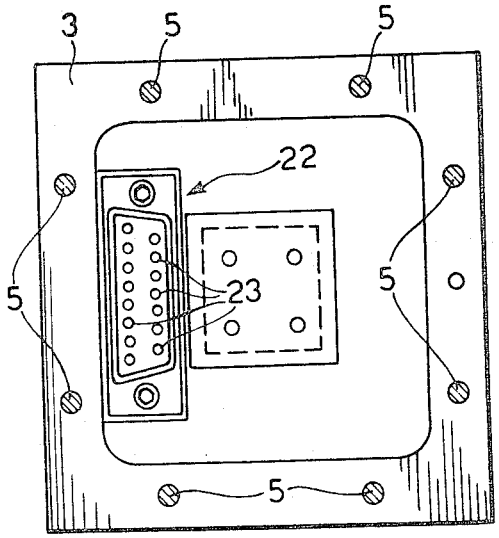
FIG. 4 is a section on line IV—IV of FIG. 3.

An electrical connector 22 (FIG. 4) is attached to the inner face of the closure plate 3 of the casing 1. The connector has a plurality of terminals 23. Each block 6 and each conductive plate 8 is connected (by means not shown) to a respective terminal 23 of the connector 22. Detector means (not shown) of a known type are arranged externally of the casing 1 and are connected to connector 22 by means not shown. These detector means serve to provide electrical output signals indicative of the instantaneous values and/or of the variations in the capacitance of each of the twelve condensers constituted by the conductive plates 8 and the blocks 6. Conveniently the metal blocks 6 are maintained at a constant potential so that any variation in capacitance of a said condenser will manifest itself as a variation in the potential of the corresponding conductive plate 8.

During the course of the above described "learning" phase, the operator applies to the control shaft 12 moments and forces which are converted into very small angular and linear displacements of the body 7 relative to the casing 1 and thus of the conductive plates 8, relative to the facing end faces of the blocks 6. These displacements produce variations in the capacitances of the said condensers which, in turn, give rise to variations in the potentials of the conductive plates 8, these latter variations being indicative, in a manner which will be described below, of the magnitude of the stresses, forces and moments applied to the control shaft 12.

The operation of the transducer will now be described.

FIGS. 7, 8 and 9 illustrate the main operative components of the transducer for three different positionings of the body 7 with respect to the metal blocks 6 carried by the casing 1.

FIG. 7 illustrates the relative positions of the body 7 and the metal blocks 6 when no stresses are applied to the control shaft 12. In this situation all the conductive plates 8 are substantially equidistant from the end faces of the corresponding blocks 6.

Therefore the capacitance of the twelve condensers constituted by the twelve plates 8 and the blocks 6 have substantially the same value.

FIG. 8 illustrates the position assumed by the body 7 relative to the blocks 6 after the body 7 has been linearly displaced along the X axis by a force acting parallel to this axis X. In this situation, each of the two condensers formed by the plates 8 attached to the right hand face of the body 7 (as viewed in FIG. 8) and by the end face of the opposed block 6, assumes a capacitance value greater than that corresponding to the situation illustrated in FIG. 7; this is so because the distance between the said conductive plates 8 and the corresponding block 6 has been reduced. In contrast, the capacitance of each of the two condensers formed by the plates 8 attached to the left hand face of the body 7 and by the end face of the opposed block 6, is reduced in proportion to the increase in the distance between the said conductive plates and the corresponding block 6. By detecting the changes in capacitance of the condensers constituted by the plates 8 attached to opposite faces of the body 7, it is possible to generate electrical signals indicative of the stresses applied to the control shaft 12 of the transducer in directions parallel to the co-ordinate axes X, Y and Z.

FIG. 9 illustrates the position assumed by the body 7 relative to the blocks 6 after the body 7 has been subjected to a rotation about the Y axis, this rotation being applied by means of the control shaft 12. In this condition, considering the conductive plates 8 attached to the right hand face of the body 7 (as viewed in FIG. 9), it is possible to detect the following:

a slight increase in the capacitance of the condenser constituted by the upper conductive plate 8 and the corresponding portion of the facing block 6 relative to the capacitance of this condenser in the rest configuration of the transducer illustrated in FIG. 7;

a slight decrease in the capacitance of the condenser constituted by the lower conductive plate 8 and the corresponding portion of the facing block 6 relative to the capacitance of this condenser in the rest configuration of the transducer illustrated in FIG. 7.

Similarly, in respect of the condensers including the conductive plates 8 attached to the left hand face of the body 7 as viewed in FIG. 9, it can be seen that:

the condenser including the upper conductive plate 8 assumes a capacitance value slightly less than in the rest configuration of the transducer;

the condenser including the lower conductive plate 8 assumes a capacitance value slightly greater than in the transducer rest configuration.

The only effect that the rotation of the body 7 about the Y axis has on the remaining eight condensers is to cause a small variation of their areas so that the capacitances of these condensers remain substantially unchanged.

From the foregoing consideration of FIG. 9, it can be seen that by detecting the changes in capacitance of the condensers comprising the conductive plates 8 attached to the same face of the body 7, it is possible to derive electrical signals indicative of the magnitude of the moments applied to the body 7 by way of the control shaft 12.

The illustrated transducer has been described with reference to its possible utilisation as a sensitive "wrist" located at the end of the movable arm of an industrial robot for the purpose of detecting stresses applied during the course of the so-called learning phase. However, it will be evident that the transducer can advantageously be utilised during the course of assembly of a workpiece by the hand of the robot, to detect the reaction stresses applied externally to such a workpiece. It will also be appreciated that the transducer can be used in applications other than robotics.

Various modifications to the described transducer are of course possible, thus, for example, the casing 1 and body 7 instead of being in the form of a cube can be of any suitable parallelepiped form.

I claim:

1. A transducer with six degrees of freedom arranged to generate electrical signals indicative of forces and moments applied to a movable member to which the transducer is connected during use, said transducer comprising:

a rigid casing intended to be connected to the said movable member, the inner surface of the said casing having three pairs of electrically conductive faces, the faces of each pair lying in planes parallel to one another and perpendicular to the planes in which lie the faces belonging to the other pairs;

a rigid body supported within said casing such as to be displaceable with six degrees of freedom relative to the casing; the outer surface of the said body comprising three pairs of faces, the faces of each pair lying in planes parallel to one another and perpendicular to the planes in which lie the faces belonging to the other pairs; each said face of the rigid body facing towards a corresponding one of the said electrically-conductive faces of the inner surface of the casing and being provided with at least two electrically conductive zones which are coplanar with and electrically insulated from one another and which together extend over substantially the whole of said body face; the conductive zones associated with each outer face of said body defining together with the corresponding electrically conductive face of the casing a respective interspace therebetween:

a shaft connected to the said rigid body and passing with clearance through a hole in the casing;

fluid supply means for feeding a dielectric fluid under pressure through the walls of the said casing into each of the said interspaces, the dielectric fluid being constrained to enter each said interspace in a direction substantially orthogonal to the associated electrically conductive face of the casing inner surface whereby the said body is fluidically supported in the said casing, the said conductive zones together with the said electrically-conductive faces of the casing which face towards these zones constituting a plurality of condensers equal in number to the number of said conductive zones, the capacitance of each said condenser being dependent on the distance between the conductive zone and casing face constituting the condenser; and an electrical connector secured to said casing and operative to provide instantaneous values of the capacitance of each of the said condensors to a detector.

2. A transducer according to claim 1, wherein the said casing and the said rigid body are both substantially in the form of a cube.

3. A transducer according to claim 1, wherein the said casing and the said body are both of substantially parallelepiped form.

4. A transducer according to claim 2 or 3, wherein the said casing comprises an outer shell in the form of a cube or parallelepiped having thin walls, and a respective element projecting inwardly from the inner surface of each shell wall, each of the said interspaces being outwardly delimited by the inner face of the corresponding said inwardly-projecting element.

5. A transducer according to claim 4, wherein each said inwardly-projecting element is constituted by a block of electrically conductive material, said block being of parallelepiped form and being secured to the inner surface of the said thin walls.

6. A transducer according to claim 1, wherein said fluid supply means comprises, for each said interspace, at least one duct formed in the thickness of the casing and opening into said interspace through an enlarged duct end portion.

7. A transducer according to claim 1, wherein each one of the said electrically-conductive zones provided on the outer surface of the said rigid body is formed with a respective electrically-conductive plate secured to the outer surface of the body.

8. A transducer according to claim 1, wherein the said dielectric fluid is constituted by compressed air.

* * * * *